(12) United States Patent
Poucher

(10) Patent No.: US 6,612,502 B2
(45) Date of Patent: Sep. 2, 2003

(54) INTEGRATED CIRCUIT CHIP FOR USE AS AN ELECTRONIC THERMOSTAT

(76) Inventor: Frank Poucher, 75 Meadowvale, Raheen, County Limerick (IE)

( * ) Notice: Subject to any disclaimer, the term of this patent is extended or adjusted under 35 U.S.C. 154(b) by 103 days.

(21) Appl. No.: 09/797,469

(22) Filed: Mar. 1, 2001

(65) Prior Publication Data

US 2001/0045470 A1 Nov. 29, 2001

(30) Foreign Application Priority Data

Mar. 1, 2000 (IE) .......................................... S2000/0163

(51) Int. Cl.⁷ .......................... G05D 23/00; G05D 15/00
(52) U.S. Cl. ................................. 236/78 D; 236/46 R
(58) Field of Search ........................... 236/46 R, 78 D; 165/267, 238; 219/492; 700/282

(56) References Cited

U.S. PATENT DOCUMENTS

| | | | | |
|---|---|---|---|---|
| 4,200,910 A | * | 4/1980 | Hall | ........................ 236/46 R |
| 4,206,872 A | * | 6/1980 | Levine | .................... 219/492 X |
| 6,006,996 A | * | 12/1999 | Bhainagar | .................. 236/78 R |

FOREIGN PATENT DOCUMENTS

| | | | |
|---|---|---|---|
| EP | 0263305 | 4/1987 | ............ G01D/3/02 |
| FR | 2590381 | 11/1985 | .......... G05D/23/20 |
| GB | 2191292 | 12/1987 | .......... G01K/15/00 |

* cited by examiner

*Primary Examiner*—William Wayner
(74) *Attorney, Agent, or Firm*—Van Dyke, Gardner, Linn & Burkhart, LLP

(57) ABSTRACT

An integrated circuit chip, useful as an electronic thermostat, comprises a temperature sensor for providing a signal corresponding to ambient temperature. A digital counter contains a value which, after digital-to-analog conversion by a DAC, corresponds to a desired trip temperature. A comparator has an output which changes state when the magnitude of the sensor signal exceeds the output of the DAC. The value in the counter is set by maintaining the sensor at a desired trip temperature and incrementing the counter until the comparator changes state.

13 Claims, 2 Drawing Sheets

INTEGRATED CIRCUIT CHIP FOR USE AS AN ELECTRONIC THERMOSTAT

FIELD OF THE INVENTION

This invention relates to an integrated circuit chip for use as an electronic thermostat. Such a device indicates whether the ambient temperature is above or below a predetermined value (trip temperature).

BACKGROUND OF THE INVENTION

There are many examples in industry where a need exists to know whether the ambient temperature is above or below a specific value. Many existing solutions involve the use of devices such as thermistors, thermocouples, RTDs and temperature-to-digital converters. These solutions involve the use of external components and end-user factory calibration. An example of a current solution is the National Semiconductor LM56 device, which requires the use of external resistors to set up the required trip temperature. Another example is the Maxim MAX6501, which is available with a number of fixed-temperature trip points typically at ten degrees Celsius intervals. In the case of temperature-to-digital converters, software development is also required. An example of this is the Dallas DS1620, which requires the end-user to program the required trip point.

SUMMARY OF THE INVENTION

The invention seeks to provide an integrated circuit for use as an electronic thermostat which needs no external set-up, calibration or programming by the end user. The invention also seeks to provide a thermostat which can be programmed with its trip temperature in the final package so that is it not susceptible, or less susceptible, to the drift which can occur when silicon chips are assembled into packages.

Accordingly, the present invention provides an integrated circuit chip comprising a temperature sensor for providing a signal whose magnitude is a function of the ambient temperature, a comparator having an output which changes state when the magnitude of the sensor signal exceeds a temperature-equivalent signal corresponding to a stored digital value, and a control unit for setting the stored digital value corresponding to a desired trip temperature.

The term "temperature-equivalent signal" as used herein refers to a signal, which may be analog or digital, which is related to and derivable from a digital value. In particular, but not exclusively, it may be used to refer to an analog signal generated by converting a digital value using a digital-to-analog converter (DAC).

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
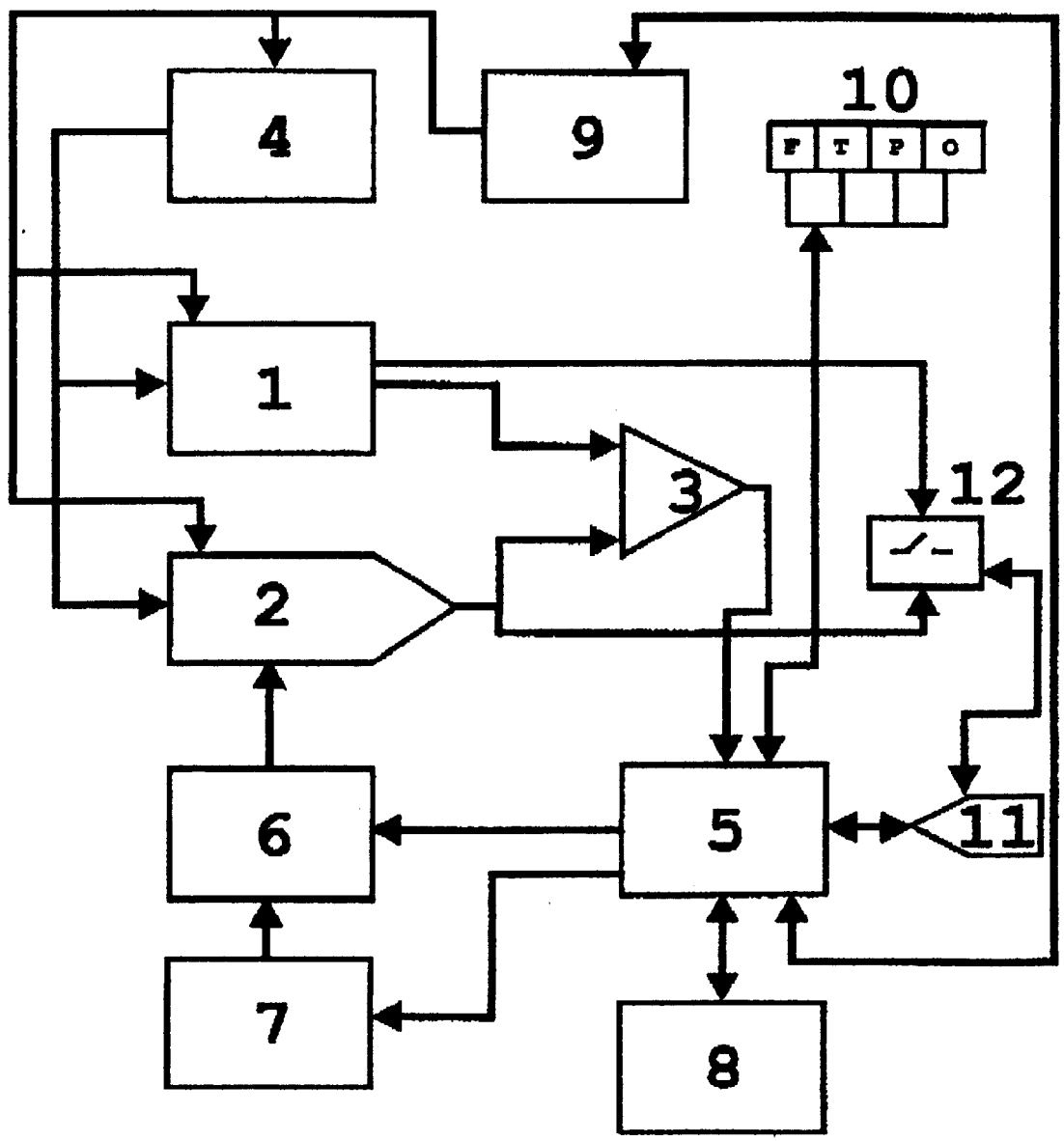
FIG. 1 is a block circuit diagram of a first embodiment of an integrated circuit chip in accordance with the invention.

Referring to FIG. 1, the device comprises a temperature sensor 1, a digital-to-analog converter (DAC) 2, an analog comparator 3, a reference circuit 4, control logic 5, a digital counter 6, a non-volatile digital trip register 7, a non-volatile digital hysteresis register 8, a timer 9, flags (f, t, p, and o) 10, an input/output pin 11 and a switch 12, all connected as shown in the drawing. The temperature sensor 1 is of a type which provides an output voltage whose magnitude is proportional to ambient temperature, for example a current source in series with a forward biased diode, wherein the output voltage is inversely proportional to the diode temperature. The reference circuit 4 ensures that the trip temperature is not sensitive to power supply variation and allows for a wide power supply operating range.

The non-volatile register 8 may be either a reprogrammable memory or a one-time programmable memory. While the former is preferable for the versatility it provides to users, the latter is currently more stable and reliable over extended periods.

The operation of the device is under the control of the control logic 5, and the function of the various components identified above is best explained by describing the various modes of operation of the circuit.

1. Test Mode

In this mode the device provides a sequence of signals to the output pin 11, such as the DAC 2 output and the output of the temperature sensor 1, via the switch 12, and the state of the flags 10 and the state of the trip register 7 and hysteresis register 8 via the control logic 5.

2. Trip Temperature Programming Mode

In this mode the thermostat's trip temperature is programmed as follows. The ambient temperature of the sensor 1 is brought to the desired trip temperature. Power is applied to the thermostat and the control logic 5 checks the status of the 'device programmed' flag P. If the flag is not set then the control logic proceeds to set the trip temperature as follows.

The control logic 5 begins by incrementing the digital counter 6 from zero thereby ramping the analog output of the DAC 2 from zero upwards until the DAC 2 output voltage is greater than the analog output from the temperature sensor 1. At this point the output of the comparator 3 will change state and this is detected by the control logic 5. The control logic 5 stops incrementing the digital counter 6 and then programs the value of the counter 6 into the trip register 7. The desired trip temperature is thus stored in the trip register 7 as a digital value. At the end of the programming phase, the 'device programmed' flag P is set.

Incremental variation of the digital value is not the sole means of determining the value corresponding to the trip temperature. Thus, for example, a method of successively closer approximations could be used to determine the digital value. In the preferred embodiment, incremental increases of the counter in single steps are preferred for simplicity.

3. Hysteresis Programming Mode

After the trip temperature has been programmed, it is necessary to set the amount of hysteresis in the trip temperature. This is done by inputting a desired number of pulses to the input/output pin 11, which are used to increment the hysteresis register 8. The digital value thus stored in the hysteresis register is subtracted or added to the value in the trip register 7 as appropriate when the comparator 3 changes state in the normal operating mode, which follows.

4. Operating Mode

In order to reduce energy requirements, the illustrated thermostat is provided with a timer enabling it to operate intermittently, by powering up for short periods to sample the temperature, and powering down for longer dormant periods to reduce energy requirements. The duration of the power-up and power down periods can be programmed into control logic 5, depending on the application to which the thermostat is to be put, the environment in which the thermostat is located, and the thermal response time of the thermostat chip. This mode of operation may reduce the power requirements of the thermostat by e.g. 90%, which may be particularly important in battery-powered devices, or in other power-sensitive applications.

Each time that power is applied to the thermostat the control logic 5 checks the value of the 'device programmed' flag P. If this flag is set then the digital value stored in the trip register 7 is buffered into the digital counter 6 and applied to the DAC 2 which effectively reconstructs (within the resolution limits of the circuit) the analog value which was output from the temperature sensor 1 at the desired trip temperature, also referred to as the temperature-equivalent signal. The temperature-equivalent signal serves as a level against which the analog output from the temperature sensor 1 is compared by the comparator 3, the output of the comparator 3 changing state from low to high when the sensor output exceeds the temperature-equivalent signal. The output of the comparator 3 is applied to the output pin 11.

At the same time, the digital value in the hysteresis register 8 is subtracted from the digital value in the counter 6 (which initially stored the value in the trip register 7) so that the analog output of the DAC 2 is lowered by a small voltage. Then, when the sensor output once more falls below the temperature-equivalent signal (as thus adjusted for hysteresis) by the output of the comparator 3 going from high to low, the digital value in the hysteresis register 8 is added to the digital value in the counter 6 to restore the value to its former level. These operations occur each time the output of the comparator changes state, the temperature-equivalent signal being lowered each time the output of the comparator 3 goes from low to high and being raised each time it goes from high to low. This hysteresis effect avoids "hunting" when the ambient temperature is fluctuating around the trip temperature.

An example of how the thermostat operates including the hysteresis function is as follows:

Let us say that the device is programmed to show an output signal '1' on the pin 11 when the ambient temperature rises above 90° C. and an output signal '0' when the ambient temperature falls below 88° C. The device operates internally as follows:

Ambient <90° C.: The trip register 7 contains the digital value corresponding to the 90° C. trip temperature. The comparator 3 output is low. The output pin 11 is low.

Ambient >90° C.: The comparator 3 output goes high. This is transferred to the output pin 11, which goes high. The digital value in the hysteresis register 8 is subtracted from the value in the digital counter 6. This effectively places a digital equivalent of (say) 88° C. into the DAC 2.

Ambient >88° C. and <90° C.: The comparator 3 output remains high.

Ambient <88° C.: The comparator 3 output goes low. The digital value in the hysteresis register 8 is added to the value in the digital counter 6, thus re-establishing the original reference level. This may done by re-loading the contents of the trip register 7 into the digital counter 6.

In a practical implementation all of the components shown in the Figure may be integrated onto the same silicon circuit with external connections made by pins connecting to external circuitry.

The minimum possible package pin count implementation has three pins—positive power supply (VCC), ground (GND) and input/output Pin 11. The pin 11 acts as an input/output pin when the device is being tested and programmed and as an output pin when the device is in operating mode. The desired switching voltage may be factory-programmed to suit user requirements. The temperature resolution to which the device can be programmed is effectively set by the resolution and monotonicity of the DAC.

The above embodiment provides a device which requires no user calibration and which can be made very accurate, physically small (and hence has a very good thermal response time) and with low power consumption. A particular advantage is that the trip temperature may be set in the final package. This allows for a lot of flexibility in the provision of thermostats that switch at temperatures that are very close to the exact temperatures that customers need. It also means that small quantities can be provided to suit customer demands. This is in direct contrast to other devices where the trip temperature is set at wafer level, which generally means that all of the dice on the wafer have the same trip temperature. So, if a customer wishes to purchase a non-standard trip temperature, he may have to buy a minimum of all of the dice on a single wafer. This could mean a minimum purchase quantity of ten thousand pieces.

Figure 2:
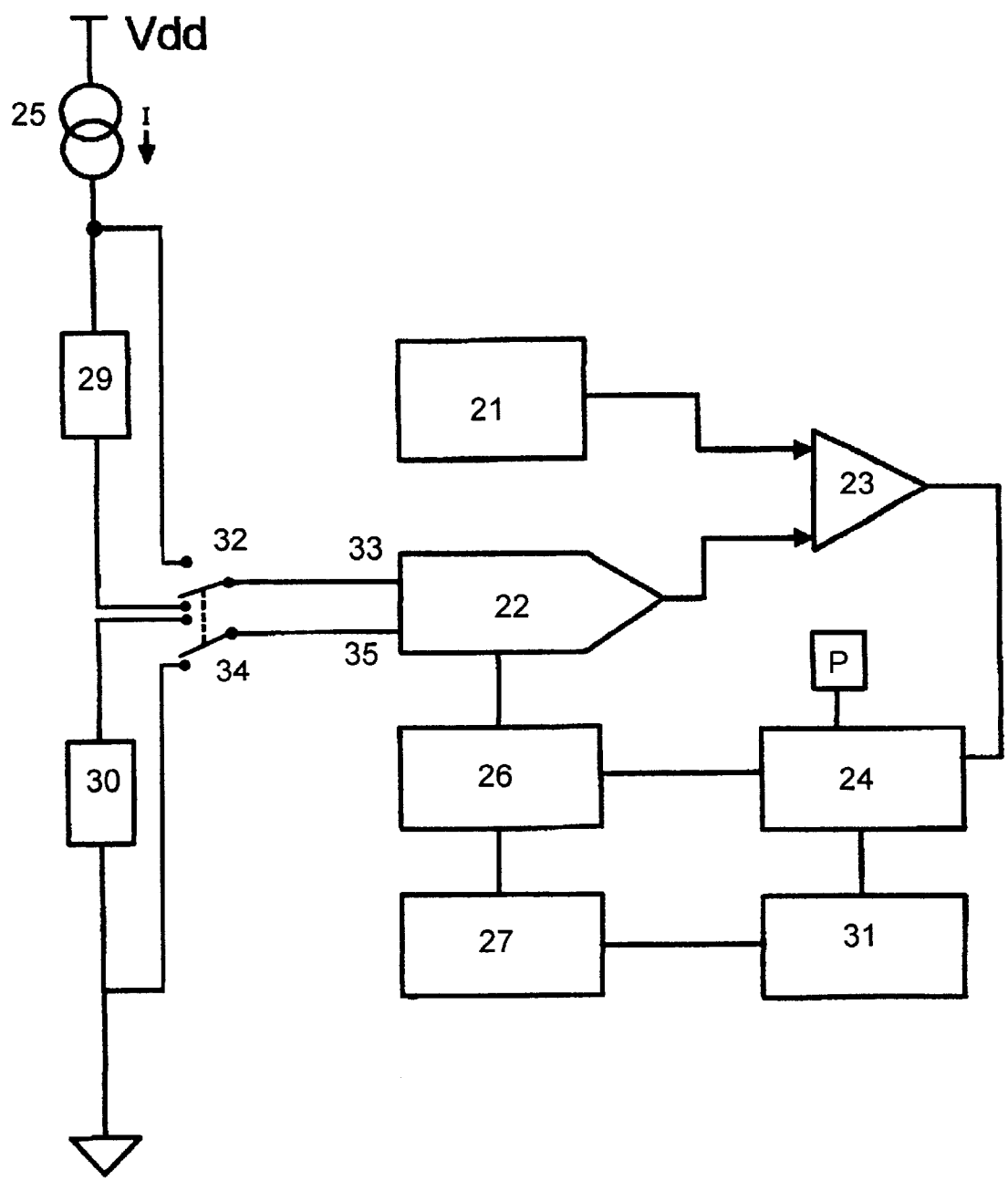
FIG. 2 is a block circuit diagram of a second embodiment of an integrated circuit chip in accordance with the invention.

A second embodiment of the invention, FIG. 2, comprises a temperature sensor 21, a digital-to-analog converter (DAC) 22, an analog comparator 23, control logic 24, a current source 25, a digital counter 26, a non-volatile digital trip register 27, a flag P, first and second hysteresis resistors 29 and 30, an input/output pin 31, and a pair of ganged changeover switches 32 and 34, all connected as shown in the drawing.

The temperature sensor 21 is of a type which provides an output voltage whose magnitude is proportional to ambient temperature, for example a current source in series with a forward biased diode, wherein the output voltage is inversely proportional to the diode temperature.

The DAC 22 can be a form of string DAC, e.g. resistor string, folded resistor string, or multiple resistor string. It is supplied by the current source 25 which eliminates the need for the reference circuit 4 of FIG. 1, thereby reducing the complexity and cost of the circuit.

The current source 25 is connected via the switch 32 to the "reference" connection 33 of the DAC, the "ground" connection 35 of the DAC being connected to a ground point by the switch 34. When the switch contacts of the ganged changeover switches 32/34 are in their lower position, as seen in FIG. 2, the resistor 29 in the reference circuit is connected in series between the current source 25 and the reference connection 33, and the ground connection is directly connected to ground. However, when the switch contacts are in their upper position, the resistor 30 in the ground circuit is connected in series between the ground connection 35 and ground, and the current source is directly connected to the reference connection 33. This allows the reference input voltage to the DAC to be varied and, accordingly, the level of the reconstructed analog signal for a given digital input signal.

The current source 25 ensures that the DAC output is not sensitive to power supply variation and allows for a wide power supply operating range. The DAC output will vary with temperature due to changes in the resistance values of the DAC internal resistors; however, since these changes are effectively taken account of in the trip temperature register 27 at the time the trip temperature is programmed, this DAC output change with temperature is not a source of error. These changes in the DAC output due to DAC resistor changes with temperature will not increase the error of the circuit provided that the temperature coefficient of the DAC resistors is of opposite sign to the temperature coefficient of the temperature sensor, or that the effect of temperature on the output of the DAC is not significant compared to the effect of temperature on the output of the temperature sensor.

The current source driving the DAC may be mirrored using conventional current-mirroring techniques and the mirrored current thus generated used to drive the temperature sensor. This has the result that errors due to power supply variations are minimised.

The operation of the device is under the control of the control logic 24 and the input/output pin 31, and the function of the various components identified above is best explained by describing the various modes of operation of the circuit.

1. Trip Temperature Programming Mode

In this mode the thermostat's trip temperature is programmed as follows. The ambient temperature of the sensor 21 is brought to the desired trip temperature. Power is applied to the thermostat and the control logic 24 checks the status of the 'device programmed' flag P. If the flag is not set then the input/output pin 31 and the control logic 4 are used to set the trip temperature as follows.

The input/output pin 31 is driven to a sequence of logic highs and lows thereby incrementing the digital counter 26 from zero and thereby ramping the analog output of the DAC 22 from zero upwards until the DAC 22 output voltage is greater than the analog output from the temperature sensor 21. At this point the output of the comparator 23 will change state and this is detected by the control logic 24 which inhibits the input/output pin 11 from further incrementing the digital counter 26. The input/output pin 31 is then raised to a programming voltage Vpp which is used to then program the value of the counter 26 into the trip register 27. The desired trip temperature is thus stored in the trip register 27 as a digital value. At the end of the programming phase, the 'device programmed' flag P is set.

2. Operating Mode

Each time that power is applied to the thermostat the control logic 24 checks the value of the 'device programmed' flag P. If this flag is set then the digital value stored in the trip register 27 is buffered into the digital counter 26 and applied to the DAC 22 which effectively reconstructs (within the resolution limits of the circuit) the analog value which was output from the temperature sensor 21 at the desired trip temperature. The reconstructed analog value serves as the temperature-equivalent signal against which the analog output from the temperature sensor 21 is compared by the comparator 23, the output of the comparator 23 changing state from low to high when the sensor output exceeds the reference level.

The output of the comparator 23 is applied to the output pin 31. At the same time the control logic 24 switches over the ganged changeover switches 32/34 so that the analog output of the DAC 22 is lowered by a small voltage (without any change in the digital reference level in the counter 26) to provide a pre-determined amount of hysteresis in the temperature comparison process. When the sensor output once more falls below the temperature-equivalent signal (as thus adjusted for hysteresis) the changeover switches 32/34 are once more switched over to raise the analog output of the DAC 22 to its former level.

In this embodiment it will therefore be seen that the adjustment for hysteresis takes place in the DAC 22, by varying its reference input voltage, while the value in the counter 26 remains constant. This contrasts with FIG. 1, where the counter value was adjusted to provide the hysteresis. In order to ensure that the amount of hysteresis is reasonably accurate, the two hysteresis resistors 29 and 30 may consist of a multiple of the unit resistor used to construct the DAC 22.

The invention is not limited to the embodiments described herein which may be modified or varied without departing from the scope of the invention.

What is claimed is:

1. An integrated circuit chip comprising a temperature sensor for providing a signal whose magnitude is a function of the ambient temperature, a comparator having an output which changes state when the magnitude of the sensor signal exceeds a temperature-equivalent signal corresponding to a stored digital value, and a control unit for setting the stored digital value corresponding to a desired trip temperature.

2. An integrated circuit chip as claimed in claim 1, wherein the control unit comprises counter control logic for varying a digital counter to generate a plurality of digital values, and a memory for storing the digital value for which a comparison between the corresponding temperature-equivalent signal and the sensor signal causes the output of the comparator to change state.

3. An integrated circuit chip as claimed in claim 1, wherein said sensor signals and said temperature-equivalent signals are analog signals and said chip further comprises a digital-to-analog converter (DAC) for converting a digital value into its corresponding temperature-equivalent signals.

4. An integrated circuit chip as claimed in claim 3, wherein said variations of the digital counter are incremental.

5. An integrated circuit chip as claimed in claim 3, wherein the DAC is provided with reference and ground inputs and wherein the DAC is powered by a current source connected to the reference input.

6. An integrated circuit chip as claimed in claim 5, further comprising a current mirror for mirroring the current source driving the DAC, and for supplying the mirrored current thus generated to drive the temperature sensor.

7. An integrated circuit chip as claimed in claim 1, further including hysteresis logic for subtracting a predetermined digital value from the stored digital value when the output of the comparator changes state in one direction and for adding a predetermined digital value to the stored digital value when the output of the comparator changes state in the opposite direction.

8. An integrated circuit chip as claimed in claim 1, further including a hysteresis circuit for decreasing the temperature-equivalent signal when the output of the comparator changes state in one direction and increasing the temperature-equivalent signal when the output of the comparator changes state in the opposite direction.

9. An integrated circuit chip as claimed in claim 8, wherein said sensor signals and said temperature-equivalent signals are analog signals and said chip further comprises a digital-to-analog converter (DAC) for converting a digital value into its corresponding temperature-equivalent signals.

10. An integrated circuit chip as claimed in claim 8, wherein the DAC is provided with reference and ground inputs and wherein the hysteresis circuit for increasing and decreasing the temperature-equivalent signal comprises means is operable to adjust the reference input to the DAC.

11. An integrated circuit chip as claimed in claim 10, wherein the hysteresis circuit comprises circuit elements for varying resistance values in the reference and ground circuits respectively in opposite directions.

12. An integrated circuit chip as claimed in claim 10, wherein the DAC is powered by a current source connected to the reference input.

13. An electronic thermostat comprising an integrated circuit chip comprising a temperature sensor for providing a signal whose magnitude is a function of the ambient temperature, a comparator having an output which changes state when the magnitude of the sensor signal exceeds a temperature-equivalent signal corresponding to a stored digital value, and a control unit for setting the stored digital value corresponding to a desired trip temperature.

* * * * *